Patented Jan. 3, 1939

2,142,093

UNITED STATES PATENT OFFICE 2,142,093

METHOD OF PRODUCING DRY CASEIN

Forest H. Clickner, Chicago, Ill., assignor to Kraft-Phenix Cheese Corporation, Chicago, Ill., a corporation of Delaware No Drawing. Application September 24, 1934, Serial No. 745,289

2 Claims. (Cl. 99—20)

My invention relates to a composition obtainable from milk and more particularly to an improved casein capable of utilization in the industrial arts and in the manufacture of food products. The improved casein produced in accordance with my invention is highly dispersable in aqueous liquids to form a permanent colloidal solution substantially similar to that of fish glue. Said casein is also substantially neutral, and is in a similar chemical state to the casein of natural milk, i. e., a calcium caseinate, and represents a marked improvement over the known alkali caseinates.

Example

In accordance with a preferred embodiment of my invention, skim milk is heated by a counterflow method to approximately 110° F. and is then quickly and intimately mixed with acid, such as HCl. The curd thus formed is bathed in its whey for between 10 and 20 minutes so as to allow time for the acid in the whey to penetrate into the interior of the granules of the curd and to bring all the casein to its iso-electric point; thereupon, before there has been any substantial sugar contamination of the casein, the whey is drawn therefrom and the curd is pressed and washed in cold water repeatedly until free of acid and sugar. Three washes are usually necessary.

Thus far the procedure is substantially the same as described in my co-pending application Serial No. 691,360, filed September 28, 1933, patented June 16, 1936, No. 2,044,282, and I may use apparatus as disclosed in said application.

The wet curd produced in the manner described above from about 9,000 pounds of milk is mixed with about 1,000 pounds of water for about 30 minutes at about 145–165° F. This step pasteurizes the material and places the casein in glue-like solution. More or less water may be used, but the quantities as indicated here are found to give good results. The fluid mixture thus obtained, if not to be used as such, is preferably dried in any suitable manner, preferably in a thin film on rollers, at temperatures customary in the drying of milk. Other drying methods, as by spraying, may be used.

The dry material thus prepared may be removed from the drying cylinder in the form of light flakes and readily breaks into small particles when packed.

The material produced as described above is a casein containing a low calcium or ash content and is substantially completely and rapidly dispersable in water and other aqueous liquids. In its dispersability my improved casein may be compared with powdered fish glue, and, like it, dissolves in water to form a sort of syrup, becoming rapidly disseminated in water. My improved casein is also characterized by being substantially neutral chemically and substantially free of lactose and other impurities, and is substantially tasteless.

As a modification in the process described above, the dry and powdered casein may be washed with isopropyl alcohol or other appropriate solvent for the purpose of extracting any lipoid fraction which may contaminate the casein and reduce its solubility.

The material described above may be utilized in the industrial arts in any connection where the properties herein referred to are of value. For example, it may be utilized as an edible glue or as a thickener for food compounds, more particularly fluid foods, such as soups, sauces, etc.

In the past it has been common to add milk and cream to such articles of food as soups, sauces, etc., but this practice has been subject to certain disadvantages. One important objection is that colored food products such as vegetable soups (for example, tomato bisque soup) quickly lose much of their natural color when milk or cream is added and the material is then cooked.

Efforts to thicken such foods with known types of casein have not proved successful for various reasons. Known caseins are not readily dispersable in water, except alkali (sodium and potassium) caseinates, which are unavailable as foods because of their unpleasant flavor and alkaline nature, reacting with the food to kill the flavor thereof.

My improved casein makes a valuable addition to fluid foods, such as described above, and is especially valuable because of its rapid dispersability and substantial neutral chemical character with respect to the acid food flavors and freedom from lactose. When added to such food substances, especially highly colored ones, such as tomato bisque and other colored soups and sauces of vegetable or animal origin, it is found that little or none of the natural color of the food is lost in boiling. This is believed to be due to the absence of lactose from my improved casein, although I do not wish to be bound by this theory. Because of its chemical neutrality with respect to the food, the natural acid flavor of the food is not modified by the addition of my improved casein.

According to the preferred method of utilizing my improved casein, said material is added to the soup or other fluid food product and the material is then cooked in the usual manner, say, at about the boiling point of water. This results in completely and permanently dispersing the improved casein in the liquid. The food material thus prepared is then packed in the usual manner, as in cans, and sealed and is then sterilized according to the usual practice by heating between the approximate limits of 242 to 252° F.

As a modification of my invention described above, I may, instead of admixing the wet casein with water and then drying, substitute milk or other aqueous fluids for the water and otherwise conduct the process substantially as described above. The substitution of milk results in a strong and pleasing milk flavor which is imparted to any food compound to which the improved casein is added. When milk is so used, the final product contains a relatively small percentage of lactose and, therefore, does not have any substantial deleterious effect on the color of the food.

Various modifications coming within the spirit of my invention will no doubt suggest themselves to those skilled in the art. Hence, I do not wish to be limited to the specific embodiments outlined or uses mentioned except as set forth in the appended claims, which are to be interpreted as broadly as the state of the art will permit.

I claim as my invention:

1. A method of producing substantially pure dry casein which is rapidly disseminated in water forming a permanent colloidal solution, comprising treating skim milk at a temperature of about 110° F. with hydrochloric acid, bathing the curd thus formed in the acid whey solution until the casein reaches its iso-electric point, washing the casein with an aqueous solution until substantially all the lactose and acid are removed therefrom, dissolving the wet casein in water at a temperature of about 145° to 165° F., and drying the casein.

2. A method of producing substantially pure dry casein which is rapidly disseminated in water forming a permanent colloidal solution, comprising treating skim milk at a temperature of about 110° F. with hydrochloric acid, bathing the curd thus formed in the acid whey solution until the casein reaches its iso-electric point, washing the casein with an aqueous solution until substantially all the lactose and acid are removed therefrom, dissolving the wet casein in water at a temperature of about 145° to 165° F., drying the casein and washing the dry casein with an organic solvent until substantially all of the lipoids are removed therefrom.

FOREST H. CLICKNER.